United States Patent [19]
Kramer et al.

[11] Patent Number: 4,799,174
[45] Date of Patent: Jan. 17, 1989

[54] MULTIPLE SET POINT CONDITION MONITORING SYSTEMS

[75] Inventors: L. Jonathan Kramer, Warminster; Steven R. Petersen, Ambler, both of Pa.

[73] Assignee: Drexelbrook Controls, Inc., Horsham, Pa.

[21] Appl. No.: 113,358

[22] Filed: Oct. 23, 1987

Related U.S. Application Data

[63] Continuation of Ser. No. 839,794, Mar. 13, 1986, abandoned.

[51] Int. Cl.⁴ ............................................. G01F 23/26
[52] U.S. Cl. ................................ 364/550; 324/58.5 R; 73/304 C; 364/509
[58] Field of Search ............... 364/481, 508, 509, 550, 364/551; 340/870.16, 601, 603; 324/57 R, 60 R, 60 C, 58.5 R; 73/1 H, 304 C

[56] References Cited

U.S. PATENT DOCUMENTS

| | | | |
|---|---|---|---|
| 3,706,980 | 12/1972 | Maltby | 340/244 |
| 3,781,672 | 12/1973 | Maltby et al. | 324/61 |
| 3,879,644 | 4/1975 | Maltby et al. | 317/246 |
| 4,063,447 | 12/1986 | Mathison | 60/712 |
| 4,064,753 | 12/1977 | Sun eet al. | 73/304 |
| 4,169,543 | 10/1979 | Hall | 73/304 C |
| 4,232,300 | 11/1980 | Wright et al. | 73/304 C |
| 4,383,444 | 5/1983 | Beaman et al. | 73/304 C |
| 4,485,673 | 12/1984 | Stern | 73/304 |
| 4,555,941 | 12/1985 | Fathauer et al. | 340/870.16 |
| 4,568,874 | 2/1986 | Kramer et al. | 324/61 |
| 4,624,139 | 11/1986 | Collins | 73/304 C |

Primary Examiner—Parshotam S. Lall
Assistant Examiner—Brian M. Mattson
Attorney, Agent, or Firm—Woodcock Washburn Kurtz Mackiewicz & Norris

[57] ABSTRACT

A multiple set point material condition monitoring system includes a material responsive sensor developing a material condition dependent admittance and a reference admittance generator, generating a plurality of different admittance values in a predetermined sequence repeatedly during operation of the system. The circuitry coupled with the sensor and the reference admittance generator outputs a signal which is a function both of the material condition generated admittance and each of the plurality of reference admittance values, in sequence. Storage means are provided for storing a characteristic of the output signal for feedback to the circuitry when that particular reference admittance value for generating that output signal is again generated by the reference admittance generator. Preferably, the sensor and reference admittance generator are coupled across each of a pair of arms of bridge network which constitutes part of the circuitry developing the output signal.

24 Claims, 9 Drawing Sheets

MULTIPLE SET POINT CONDITION MONITORING SYSTEMS

This is a continuation of application Ser. No. 839,794, filed Mar. 13, 1986 now abandoned.

FIELD OF THE INVENTION

The invention relates to capacitance systems for monitoring the condition of materials and, in particular, to admittance responsive systems for monitoring the condition of materials at two or more discrete points.

BACKGROUND OF THE INVENTION

Systems for monitoring the condition of materials (i.e., material level, pressure, proximity, etc.) at a plurality of discrete condition points are known. These systems generally fall into two categories.

Systems of the first category generally operate by converting a measurable variable, such as capacitance or admittance, which is proportional to a material condition being studied, such as height, into an analog signal proportional to the measured variable. The analog signal is then compared to a plurality of discrete signals or converted to a digital signal which is compared with the plurality of discrete values. In one multi-point monitoring system of the first category known to the inventors, radio frequency admittance measurements are converted to an analog signal which is routed to a plurality of current-sensing set point relays. A major problem with such systems is that each stage of operation upon the measured variable, such as amplification, conversion, or comparison, has the potential of introducing spurious effects. In combination, these effects may be sufficient to generate a false output at the comparison stage. It would be necessary to use relatively expensive, very high quality circuit components with very narrow operating tolerances to prevent the introduction of spurious effects.

Systems of the second type incorporate a bridge which compares the measured variable corresponding to the material condition being studied with a reference variable. The output of the bridge is thereafter processed to provide a useful signal. The major advantage of this type of system over the first is that the introduction of spurious effects from the processing circuitry has limited impact because the critical step, bridge comparison, occurs before amplification and subsequent signal processing steps. Known multiple set point monitoring systems which incorporate a bridge are typically operated at balance at a single point and off balance for other points. The balance point may or may not be a set point of interest.

A problem in all known multiple set point systems of both categories is that potentially interfering signals may be present either where the material is being measured or where the resulting measurement signal is processed. It may be necessary to guard the measurement signal against these interfering signals to prevent a false reading of the system. It is considerably more difficult to guard a signal which takes on a wide range of values than it is to guard a signal which is only of interest at a single value. This particular difference is so significant that it allows relatively inexpensive single-point monitoring systems to outperform more expensive, analog monitoring systems in which interfering signals are present. Such signals might arise, for example, by residual coatings of conductive materials on the sensing element in radio frequency admittance-type material level systems.

Single set point bridge systems are desirably balanced near the set point being examined. In single set point guarded systems, the reference potential of the bridge typically provides a low impedance source of voltage which will be the same as the sensing element voltage when the bridge is balanced. This allows the reference potential to be effectively used to provide a guard voltage to a guard electrode shielding the sensing element. Unfortunately, when the bridge is not balanced, the voltage at the sensing electrodes departs from the reference potential. This renders a guard electrode coupled with the reference potential less effective.

A number of other single set point, material condition monitoring systems are known which are capable of generating a plurality of sequential reference signals for calibration. For example, commonly assigned U.S. Pat. No. 4,485,673 to Stern discloses a single set point two-wire level measuring system utilizing a pair of admittance sensitive sensors, each including a capacitive balance bridge. A pair of set point calibration systems is provided, each with a multiplicity of capacitances. The capacitances are selectively coupled to each of the two bridge networks provided for set point calibration. The system is thereafter operated with fixed reference capacitances. U.S. Pat. No. 4,555,941 describes a material level detection system incorporating an automatic calibration circuit in which capacitances are automatically switched into an LC or resonant circuit. Both systems are unsuited for multi-set point operation in their present configuration. Each lacks means for changing the reference set point during monitoring operations. Each also lacks a feedback loop which would adapt to changes in the reference set point during monitoring operations.

U.S. Pat. No. 4,063,447 to Mathison discloses a monitoring system having a bridge network in which a reference current source is adjusted automatically to compensate for system drift. It is also unsuited for multi-set point operation in its given configuration.

U.S. Pat. No. 4,383,444 discloses a capacitance level detection system of the first category in which a measurement capacitance is processed and then compared to a reference capacitance. A microprocessor is provided as part of the system for automatic calibration. There is no teaching or suggestion that this system is useful for or capable of multi-set point operation. Being a first category type system, it is also susceptible to spurious effects during measurement and signal processing.

Lastly, adjustable differential set point monitoring systems are known. Such systems have typically been provided for monitoring sumps and the like. A bridge is provided with a material condition responsive sensor for developing a variable, material condition dependent admittance. A primary capacitor provides a reference admittance. When the bridge output switches as a result of low material related admittance from the sensor, which occurs when the materials in the sump falls below a first level, a second capacitor is coupled with the first capacitor to raise the reference admittance. The bridge output will not switch until the material has risen to a second level above the first. The single output signal of such systems is indefinite as to a particular set point as it may be related to either of two reference capacitances.

OBJECTS AND SUMMARY OF THE INVENTION

It is an object of the invention to provide a material condition monitoring system for automatic, multi-set point operation.

It is yet another object of the invention to provide such a system which is admittance responsive.

Yet another object of the invention is to provide such a system which is also stable at each set point being monitored.

It is yet another object of the invention to provide such a system which outputs a resultant signal which is of interest at the same single value regardless of the number of set points being monitored.

It is yet another object of the invention to provide a multi-set point system automatically providing an effective guard voltage level for a material monitoring sensor.

It is yet another object of the invention to provide such a system employing a bridge in which the bridge is balanced at each of a plurality of points during monitoring operations.

It is yet another object of the invention to provide such a system without introducing instability to the system at any one or more of the multiple set points.

According to the invention, these and other objects are accomplished in a system for monitoring a predetermined condition, such as height, distance, dielectric coefficient, etc., of material which comprises a bridge network, admittance sensing means which develops a variable admittance related to the condition of the material being monitored and which is coupled with one of two arms in the variable side of the bridge network, and a sequential admittance generator automatically generating a regularly repeated sequence of different, predetermined effective admittances during the operation of the system and coupled with a remaining arm of the variable side of the bridge network. When energized in a conventional manner, the bridge network generates a signal indicating the state of imbalance of the bridge for the particular admittance coupled with the bridge.

According to one important aspect of the invention, the system continuously outputs a multiplicity of bridge state signals, one for each of the predetermined admittances.

According to another important aspect of the invention, the sequential admittance generator is formed by a plurality of admittance elements and a means for selectively coupling each of the admittance elements with the bridge. Further according to this aspect of the invention, a control system is provided for sequentially coupling the admittance elements with the bridge. The control means includes a clock and a sequencer responsive to the clock. The sequencer in turn includes an address generator driven by the clock and a decoding means for decoding the address signals generated.

It is another object of the invention to provide system feedback unique to each particular set point.

This and other objects are accomplished according to the invention with a monitoring circuit generating a signal indicative of the difference between a material generated admittance and each value of a sequence of reference admittance values, and by the provision of a storage device receiving the monitoring circuit signal and storing a corresponding characteristic of the monitoring signal for each admittance value of the sequence of referenc admittance values. In particular, according to the invention, a control circuit is provided, coupled with the storage means, which causes the generation of a feedback signal passed to the monitoring circuit. The feedback signal has a characteristic based on the corresponding characteristic stored when the particular reference admittance being employed in the monitoring circuit was last previously generated. Further according to this aspect of the invention, the control circuit sees that the corresponding characteristic of the monitoring circuit signal for a particular reference admittance value is again stored before a different reference admittance value is generated. In the described preferred embodiment of the invention, the output signal is bi-level (i.e. may assume one of two possible levels) and a latch is provided for storage of the bi-level value of the monitoring circuit signal for each of the different reference admittances generated. The latch further provides a source for the bi-level feedback signal.

Another important aspect of the invention is the circuit provided for controlling the generation of sequential reference admittance values in a condition monitoring system. The circuit includes an address generator, generating a series of identifiers each identifying a different one of a plurality of reference admittance values to be generated in a sequence, and a decoder circuit receiving the series of identifiers and controlling a sequential admittance generator which actually generates a plurality of reference admittance values in a particular sequence in the monitoring circuit. An important aspect of the invention is that the address generator can also be used to control feedback provided to the monitoring circuit. According to this aspect of the invention, a storage means, such as a latch, is coupled to the monitoring circuit. The storage means stores a characteristic value of the monitoring circuit output signal for each of the different reference admittances generated by the sequential admittance generator. The storage means operates under the control of the address generator.

These and other aspects of the invention will be apparent from the accompanying figures and following detailed description of the preferred embodiment of the invention.

DETAILED DESCRIPTION OF THE INVENTION

Figure 1:
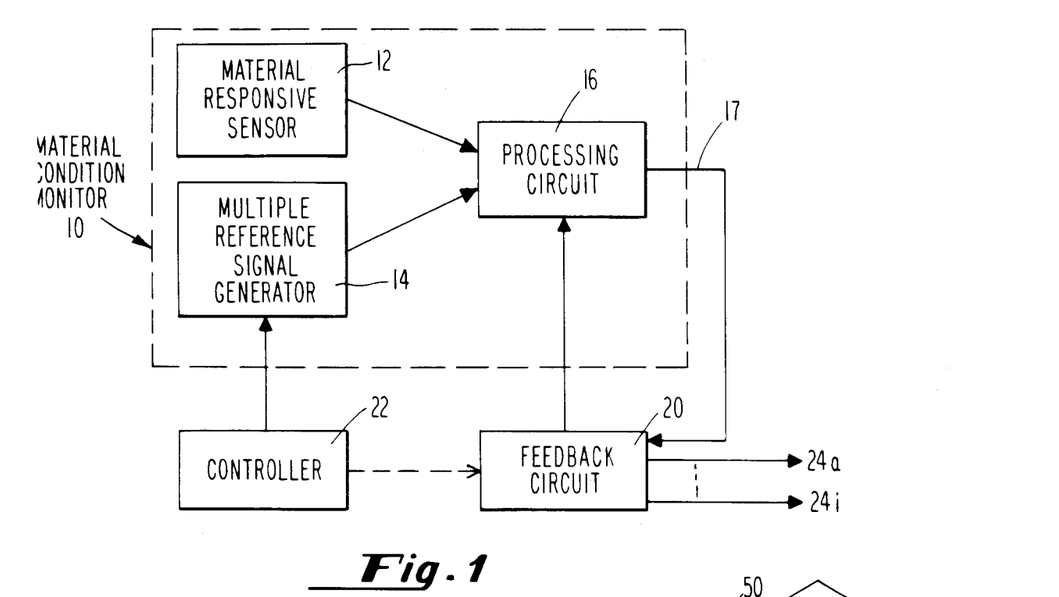
FIG. 1 is a diagrammatic block diagram of the major operating components of the invention.

In its broadest terms, the invention is depicted diagrammatically in block diagram form in FIG. 1. The invention includes a material condition monitor circuit 10 having at least a material condition responsive sensor 12, a multiple reference signal generator 14 and a processing circuit 16 coupled with each of these. An output signal on line 17 is indicative of a difference between the outputs of 12 and 14. Also provided is a controller 22 for sequencing the multiple reference signal generator to repeatedly generate a predetermined sequence of reference signals. A feedback circut 20 is also provided, in the prefered embodiment, coupled to the processing circuit 16. The feedback circuit 20 provides a selected one of a plurality of feedback signals which is matched to the particular reference signal being generated from the generator 14. The selected feedback signal is initially identical to the output signal generated by the processing circuit 16 when that particular reference signal was last generated. In the preferred embodiment of the invention, the controller 22 also controls the operation of the feedback circuit 20. In the preferred embodiment, the feedback circuit 20 also continuously outputs a multiplicity of monitor circuit state signals on a multiplicity of channels 24a-24i. Each signal represents the state of the monitor circuit for a different one of the multiple reference signals.

Figure 2:
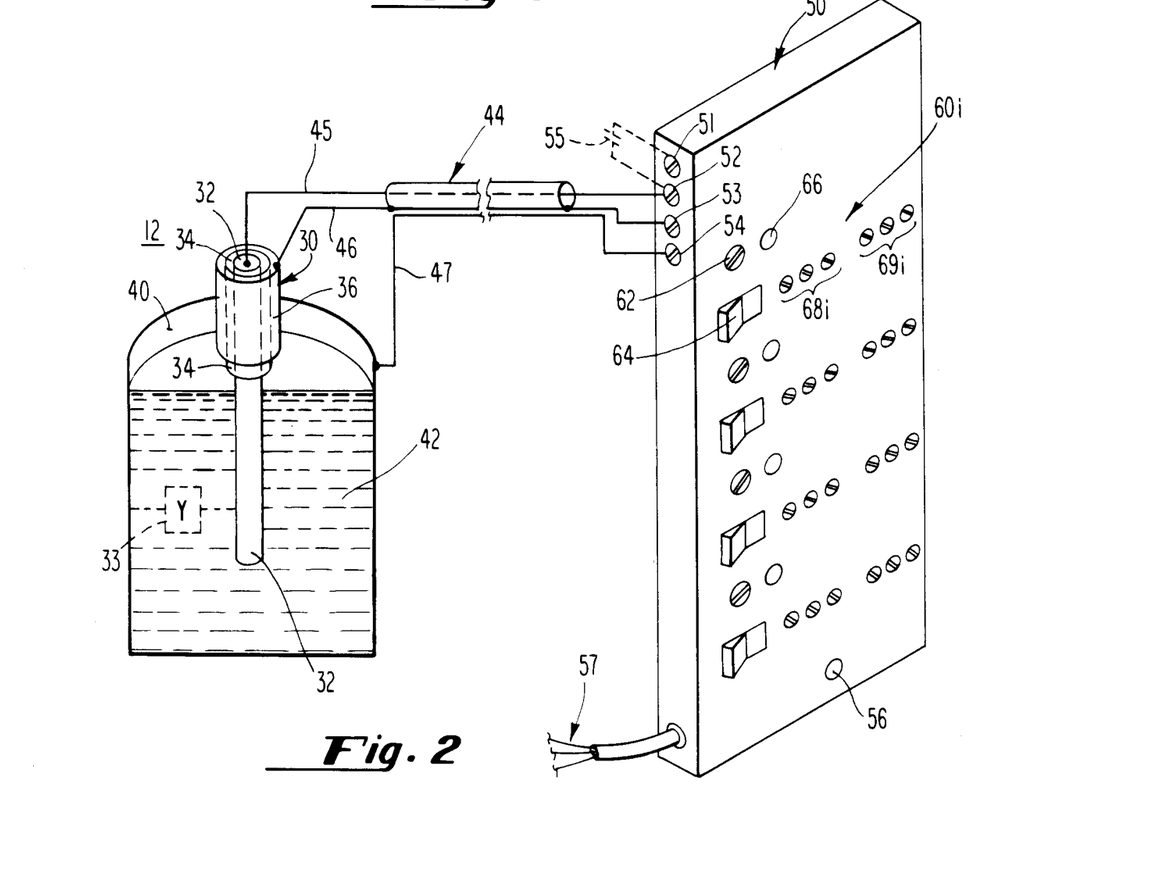
FIG. 2 is a diagrammatic depiction of the preferred embodiment of the invention.

Referring now to FIG. 2, there is depicted diagrammatically the major components of the preferred embodiment of the invention. A material condition responsive sensor 12 monitors, in this embodiment, fluid level height. The sensor 12 includes a probe assembly 30 having a central axial conductive member 32 provided as a measuring electrode. The assembly also includes a tubular outer conductive member 36 provided as a guard or shield for the measuring electrode. A tubular insulator 34 is provided for separating the two conductors 32 and 36. The probe assembly 30 is positioned within a conductive container 40 so as to be at least partially covered by a contained liquid 42 at heights of the liquid desired to be monitored. It is well known that an admittance can be developed between the measuring electrode 32 and conductive container 40 which is related to the electrical characteristics of the measuring electrode 32 the fluid 42, and its height with respect to the measuring electrode 32. This admittance Y is indicated diagrammatically, in phantom by 33.

The sensor 12 is coupled through three wire lead 44 to a remotely locatable control box 50 containing the remaining elements of the monitor circuit 10, the feedback circuit 20 and the controller 22 of FIG. 1. The three wire lead 44 includes a central conductor 45 coupled with the measuring electrode 32, an outer coaxial conductor 46 coupled with the shield member 36 shielding the conductor 45. A third lead 47 is coupled with the conductive container 40. The control box 50 includes connectors 52-54 for coupling with the remaining ends of lead 45, 46 and 47, respectively. A fourth connector 51 is provided for coupling a pad capacitor 55 between that connection and connection 52 receiving the measuring electrode lead 45. The purpose of this capacitor will be described subsequently. The box 50 further includes a set of controls, indicators and output connections 60i for each of the several fluid level set points to be monitored. Each of these sets 60i includes an adjustment 62 for adjusting a variable reference capacitor to a desired set point (i.e., desired fluid level). Also provided is a switch 64 for selecting either high level fail safe or low level fail safe switching of the system. An LED 66 responsive to the output signal of the system 10 is provided for indicating whether the fluid level is above or below the set point. Lastly, two sets 68i and 69i of three connectors each are provided for coupling the contacts of a DPDT relay, actuated by the system output signal, to other output devices (not depicted). Also provided is an LED 56, which is driven by the controller 22 in a manner to be later described so as to indicate the proper cycling of the controller 22. A conventional three wire, 120 VAC source 57 powers the system.

Figure 3:
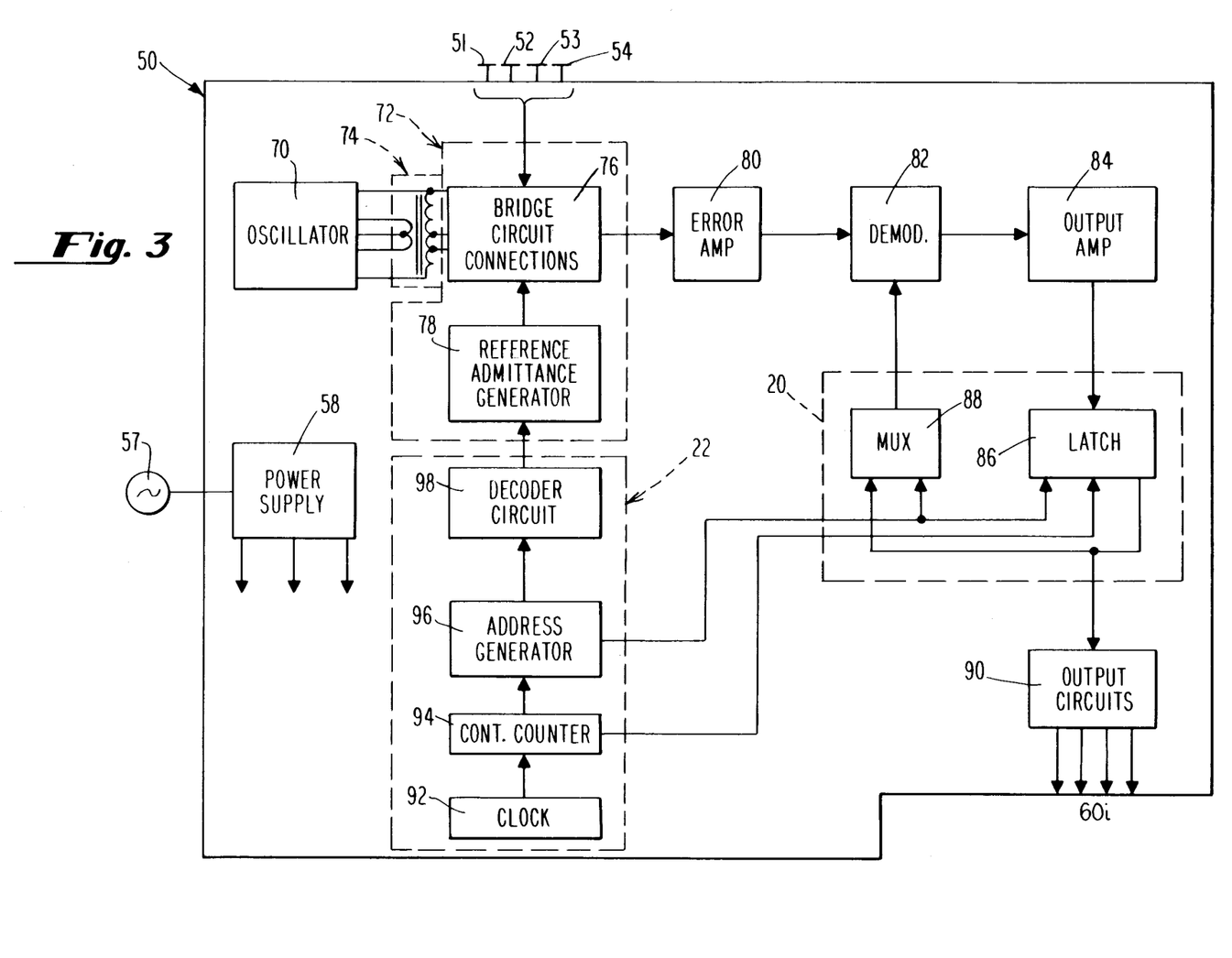
FIG. 3 is a more detailed block diagram identifying the subsystems of the preferred embodiment of the invention.

Referring now to FIG. 3, there is depicted in block diagram form the major circuit components of the control box 50. An admittance bridge 72 is coupled with an oscillator 70. The bridge includes a ratio-arm transformer 74 forming the fixed side of the bridge and providing a reference potential. The bridge 72 also includes a reference admittance generator 78 and circuitry 76 coupling the generator 78 with the external connections 51-54 from the sensor 12 and pad capacitor 55, if provided. The output of the bridge 72 is passed to a variable gain error amplifier 80. Output of the amplifier 80 is passed to a demodulator 82. The demodulator 82 is usually configured to essentially ignore the conductive component of the bridge output and to respond to the susceptive component of the bridge output. This, in turn, is related to the susceptive component of the reference and sensor admittances. The demodulator 82 outputs an analog voltage level signal passed to an output amp 84. The amp 84 generates a bi-level (binary) signal indicating the direction of bridge imbalance. The bi-level signal from the output amp 84 is passed to a feedback circuit 20 which includes in the preferred embodiment, a latch 86 provided as a combination storage means and signal generator and a multiplexer 88 provided as a feedback signal selector. The latch 86 outputs a separate signal for each admittance value generated by the reference admittance generator. These signals are carried to an equal number of output circuits 90. Each output circuit includes one of the sets 60i of controls, indicator and output connections and is associated with a single admittance set point value. The multiplexer 88 selects in sequence one of the several signals outputted from the latch 86 for feedback to the demodulator 82. Both the reference admittance generator 78 and the feedback circuit 20 are controlled by the controller 22. The controller 22 includes a clock 92 driving a continuous counter 94 which controls both an address generator 96 and the latch 86. The address generator 96 is coupled with a decoder circuit 98 associated with the bridge 72. The decoder 98 controls the operation of the reference admittance generator 78. The address generator 96 further controls the operation of the latch 86 and multiplexer 88. A power supply circuit 58 is provided coupled with the 120 VAC, 60 cycle, current source 57. The power supply circuit 58 maintains a system ground and three different positive supply voltage levels, approximately +12, +8 and B+, for energizing the various circuits and the relay including contacts 68i and 69i.

The system of FIG. 3 operates generally in the following manner. The oscillator 70 energizes the bridge circuit 72 including the ratio-arm transformer 74; this transformer may form a part of the oscillator 70 as well. The admittance generated by the condition of the material being monitored through the sensor 12 is coupled into one arm of the variable side of the bridge through the connectors 52 through 54. The reference admittance generator 78 is coupled with the remaining arm of the variable side of the bridge. The ratio-arm transformer 74 provides a fixed side of the bridge. The generator 78 generates a plurality of stable admittance values in a predetermined sequence. This sequence is continually repeated during system monitoring operations. Each different reference admittance value corresponds to a set point. As will be described in detail with respect to subsequent figures, the generator 78 of the preferred embodiment is equipped with a plurality of adjustable capacitors. Each capacitor is switched into and out of the variable side of the bridge network under the control of the controller 22 which accomplishes this cyclicly in a repeated, predetermined sequence. Generally speaking, the bridge will be balanced when the ratio of the sensor admittance to the reference admittance equals the ratio of the ratio arm transformer. The error amplifier 80 and the demodulator 82 are responsive to the degree, phase, and direction of bridge imbalance. The output of the demodulator 82 is an analog voltage level signal indicating direction, phase, and degree of imbalance. The output amplifier is provided to convert the analog signal into a bi-level (i.e., binary or logic level) signal indicative of the condition of the bridge, in particular, the direction of imbalance.

An important aspect of the invention is the mechanism for providing independent, positive feedback for each reference admittance value i.e., providing hysteresis. The latch 86 outputs a separate output signal for each reference admittance value indicating the state of the bridge imbalance for that particular admittance value. This signal for each reference admittance value is selected by the feedback multiplexer and fed back to the demodulator. This is accomplished by first coupling a new reference admittance value into the variable side of the bridge 72, and then, after the bridge 72 has had a chance to stabilize, writing the bi-level value of the output amp signal into the latch. That bi-level value is thereafter used to generate the output signal for that particular reference admittance value and to control the feedback to the demodulator until a new bi-level value is written into the latch after that particular reference admittance value is again coupled into the bridge circuit. If the feedback signals were to be derived directly from the democulator or output amp output at the instant the feedback was being applied to the demodulator, the demodulator would then be responsive to the feedback signal due to a different reference admittance value when the new reference admittance value is coupled into the bridge circuit 72. This could produce an interaction between the set points. In a case where two or more sequential set points were close in value, this could cause the output signals to switch en mass, rather than individually. Thus, the value of the output signals pass from the latch 86 to the output circuits 90 for each of the set points being monitored, corresponding to the value of the output amp output signal written into the latch the last time that reference admittance value was coupled into the bridge circuit. Thus, each reference admittance controls the system during the period of time it is actively switched into the bridge network and is independent of the other reference admittances, their associated bridge condition and output signal states. This produces the effect of having a plurality of independent controllers, all responsive to a single sensor.

Figure 4:
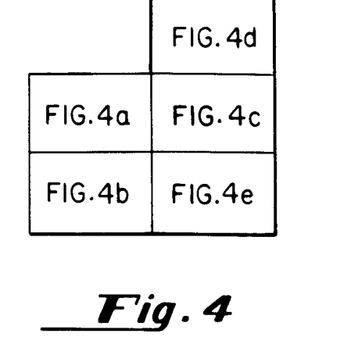
FIG. 4 is a composite diagram illustrating the relative position of FIGS. 4a–4e, a schematic of circuits of FIG. 3.

FIG. 4 is a composite diagram showing the relative position of each of the schematic FIGS. 4a–4e which depict in detail the circuits of FIG. 3.

Figure 4A:
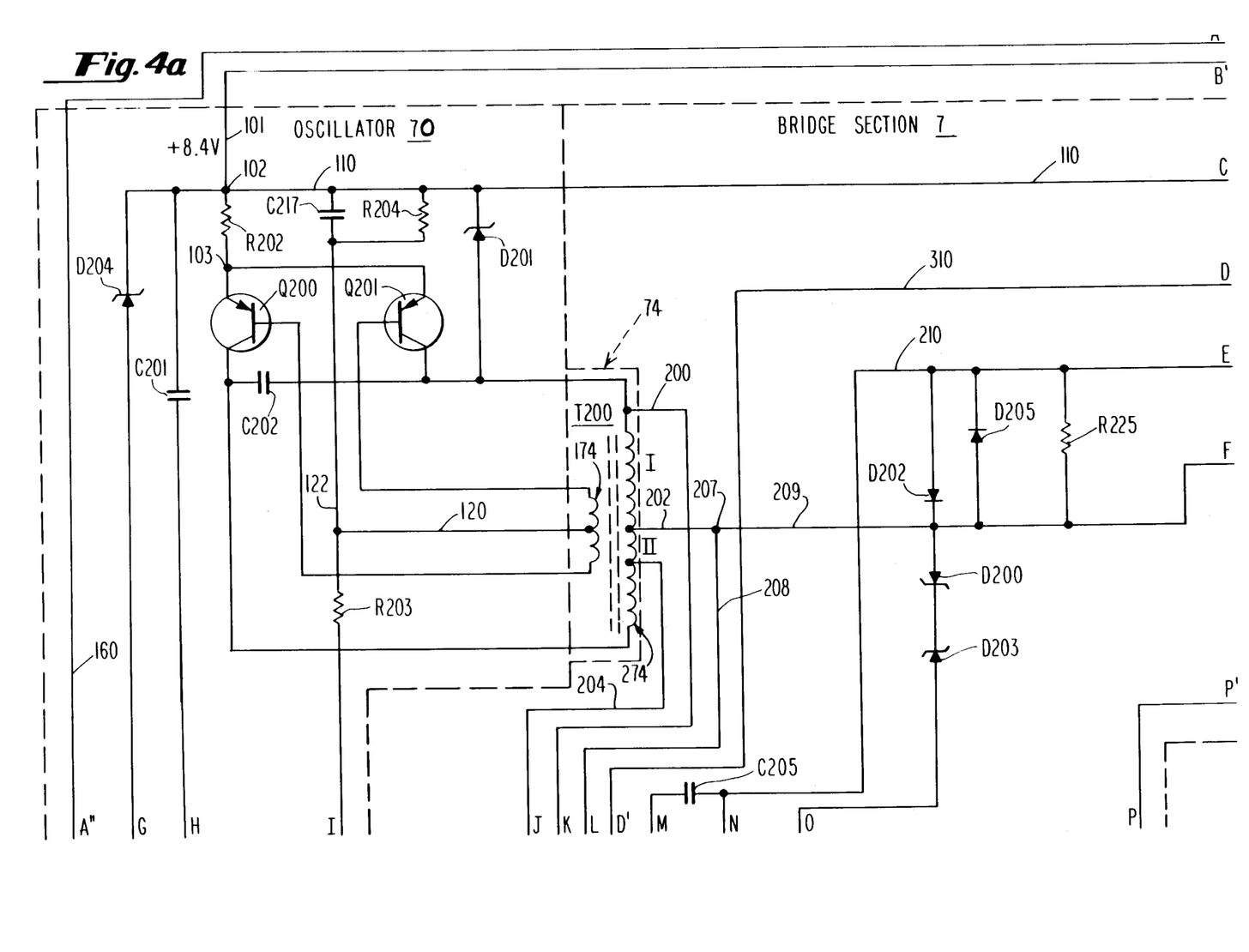
FIG. 4a is a schematic diagram of the bridge network connections with the oscillator.

Referring first to FIG. 4a, there is depicted on the left half of the figure, the circuit elements of a Class C power oscillator 70 and its connections with the bridge circuit 72. An 8.4 volt supply is provided to the oscillator on line 101 and is filtered by C201 and overvoltage protected by D 204. The inductance of winding 274 of the transformer 74 forms a resonant circuit with capacitor C202 which is alternately energized by current from the collectors of transistors Q200 and Q201, whose emitters are coupled to the 8.4 volt supply by current limiting resistor R202. The bases of transistors Q200 and Q201 are provided with D.C. bias from a divider network comprising R203, R204 and C217 through winding 174, and A.C. positive feedback from winding 174. D201 limits the voltage excursion with respect to the 8.4 volt supply.

Figure 4B:
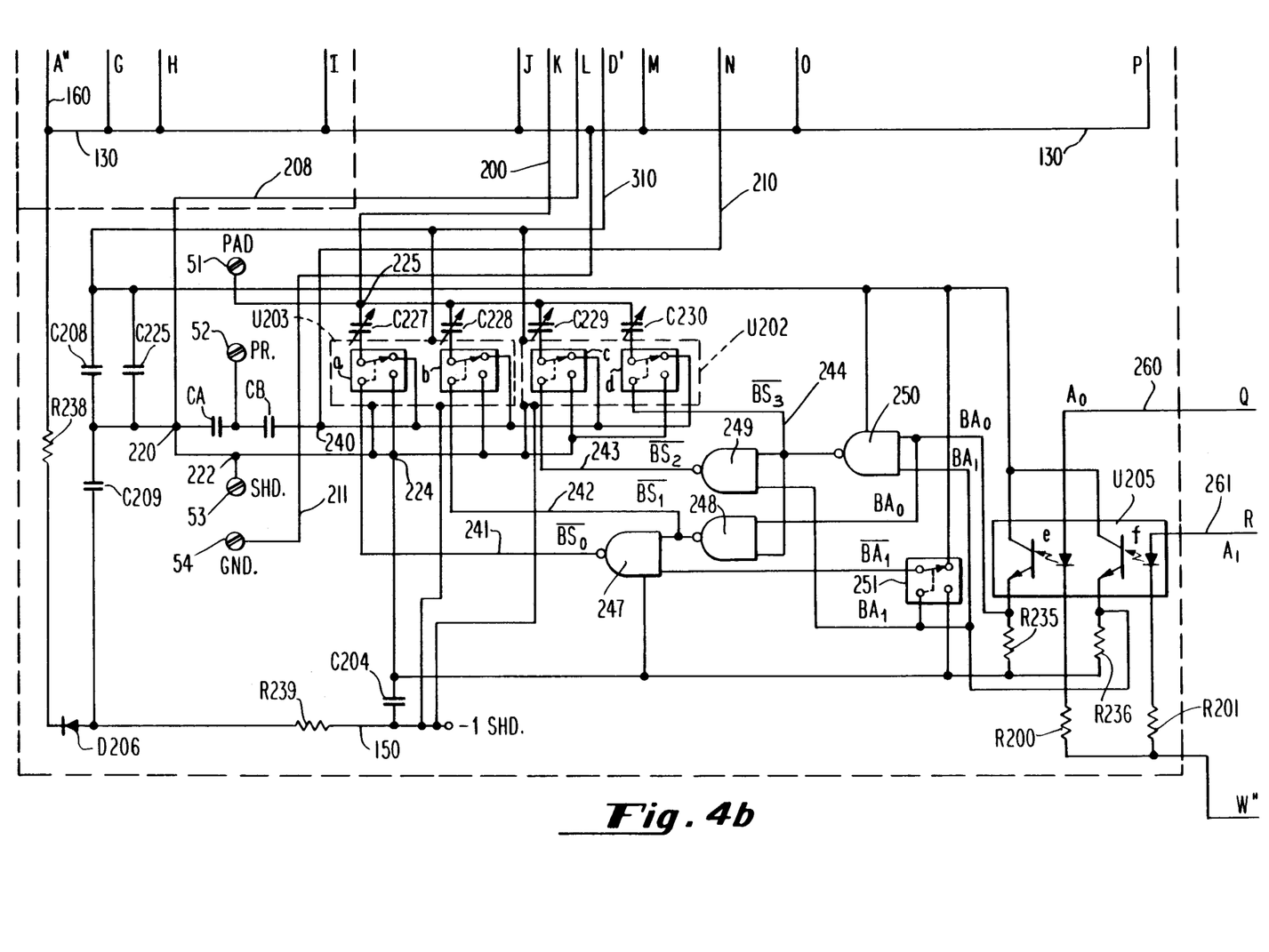
FIG. 4b is a schematic of the remainder of the bridge circuit, including the reference admittance generator and decoder logic.

The right half of FIG. 4a indicates the connection of the bridge circuit 72 including transformer 74 with the error amp 80. A line 200 extends from the "high" end of the winding 274. A line 202 extends from a central tap in the winding 274. A third line 204 extends from a tap between the central tap and low end of the secondary winding 274 as will be discussed in more detail with respect to FIG. 5. The lines supply bridge potential to other portions of the circuitry which wll be later discussed. The portion I of the winding between the central tap 202 and line 200 from the upper end forms one arm of the fixed side of the bridge network while the portion II of the winding 274 between the central tap line 202 and the lower tap line 204 forms a second arm of the fixed side of the bridge. Unequal arms are provided by the winding 274 for scaling. In the described embodiment, the ratio of the high arm I (i.e., between 300 and 202) and the low arm II (i.e., between 202 and 204) is 10/3. Line 202 provides a low impedance source of voltage which will be substantially the same as the voltage at the probe assembly measuring electrode 32 when the bridge is balanced. This allows line 202 to provide a source of voltage, hereinafter called shield potential, for the shield member 36. The line 202 branches at node 207 into a line 208. As seen in FIG. 4b, line 208 from line 202 is carried to the connector 53 coupling the control box 50 with the shield member 36. A second branch 209 from 202 is passed to the error amp 80 and is used there in a manner to be later described. Because the subject invention operates by balancing the bridge for each different set point considered, voltage supplied to the guard or shield member 36 by the bridge center along line 208 is always equal to the voltage level of the measuring electrode 32 when the bridge is balanced. Line 210 is an output line from the balance bridge network and carries the bridge output to the error amp 80. The output line 210 is coupled with the ground return line 130 (FIG. 4b) through a capacitor C205, which is provided for insuring that the bridge will always balance without additional sensor admittance. C205 is coupled in the bridge in the same arm with the admittance of probe 30 and allows the bridge to be balanced even if the probe is not connected into the bridge or if no measurable impedance is provided by the probe. This allows the system to be turned down to a zero capacitance and assures that the instrument is responsive down to a zero capacitance measurement. The output line 210 is also connected with the central tap output branch line 209 from the bridge center through a first diode D202, a second oppositely directed diode D205 and a load resistor R225. Diodes D202 and D205 are provided for static protection. The center tap branch line 209 is also connected with effective ground line 130 by a pair of zener diodes D200 and D203 coupled in series, head-to-head. These diodes are also provided for static protection and intrinsic safety and limit the voltage between shield and ground. A line 310 feeds from the error amplifier 80 and supplies power at between about $+7.5$ and 8 volts with respect to the shield voltage to the decoder circuit 98 in a manner to be described in further detail with respect to FIG. 4b.

Referring now to FIG. 4b, there is shown the remaining circuit components for the bridge connections to circuit elements, including the sensor 12 developing the material condition responsive admittance 33 and the reference admittance generator 78, and the decoder circuit 98. Line 200 from the "high" side of the secondary winding 274 is carried to a junction 225. From there, one parallel line extends to external connector 51 marked "PAD". Adjustable capacitors C227, C228, C229 and C230 are also coupled to pad potential at junction 225. In series with each of the capacitors C227 through C230 is a single pole, double throw switch a–d. Pairs of switches a–b and c–d are provided by two CMOS two-input multiplexers, U202 and U203, both type CD4053. The variable capacitances C227 through C230 and their connected switches a–d provided by U202 and U203 constitute the reference admittance generator 78 of FIG. 3. Each switch a–d has one output connected in parallel to a junction 240, and thus to the variable bridge output, and a second output connected in parallel at a junction 224, and thus to the fixed bridge output, i.e., shield potential. Each switch a–d is individually controlled by a line 241, 242, 243 and 244, respectively, extending from NAND gates 247-250 forming part of the decoder circuit 98. Shield potential line 208 passes through a junction 220 to a junction 222 coupled with external connector 53 (marked "SHD.") and with junction 224 from the switch outputs.

As has been described, a fixed side of the bridge is formed by winding 274, the upper and lower portions I and II forming a voltage divider. The capacitances C227-C230 and the connected switches a–d of the reference admittance generator 78 form one arm of the variable side of the bridge. The other or "measurement" arm of the variable side of bridge contains the admittance 33 of the sensor 12. As shown in FIG. 4a, line 204 is coupled with return line 130. As shown in FIG. 4b, a line 211 also couples the sensor ground connection 54 with the return line 130. Connections of the sensor 12 with the external connectors 52 and 54, marked "PR." and "GND", respectively, couple the material generated admittance 33 of the sensor 12 into the bridge. In many measuring situations, it is desirable to use a sensor producing more admittance than may be balanced by desirable ratios of the ratio-arm transformer 74 and maximum values of the reference capacitances C227-C230 employed (less the capacitance of capacitor C205). For that reason, a capacitive current divider comprising capacitors $C_B$ and $C_A$ coupled back-to-back between the fixed and variable bridge outputs at junctions 220 and 240, respectively, is provided. Current drawn by the sensor 12 (i.e., the measured admittance Y) is divided between CA and CB. Only CB/CA+CB times the current drawn by the sensor 12 is measured. Ratios from 1/1 to 1/650 are commonly used. For a 1/1 ratio, CB is of very high admittance, i.e., a short circuit. For offsetting the adjustment range of capacitors C227-C230 by a fixed amount, a so-called pad capacitor 55 (see FIG. 2) can be coupled across external connections 51 and 52. The pad capacitor raises the effective reference admittance. This provides a convenient means for shifting the set point ranges allowing the device to be used with a wide variety of material electrical properties and sensors having a wide variety of admittance response to material condition over the range of material condition (e.g., height), which may be of interest.

Figure 5:
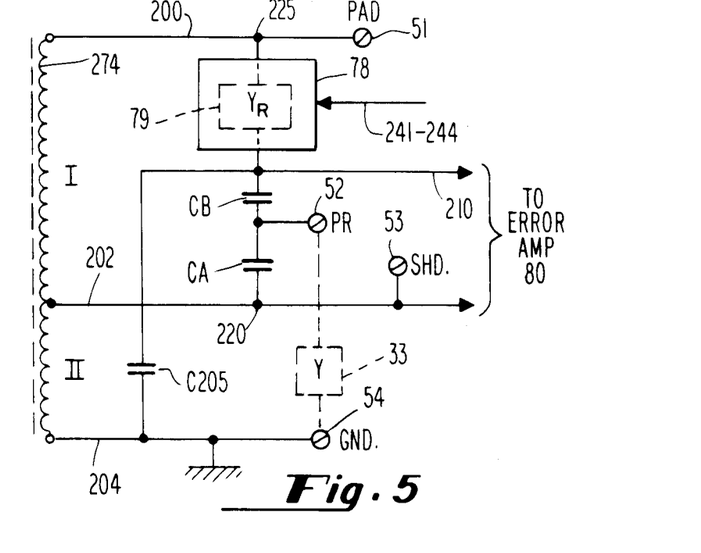
FIG. 5 is a diagrammatic depiction of an equivalent bridge.

Operation of the bridge 72 is depicted in FIG. 5. Winding 274 of ratio-arm transformer 74 provides bridge reference potentials on lines 200, 202, and 204, hereinafter sometimes called "pad", "shield", and "ground" respectively, to the remaining circuitry, and through terminals 51, 53, and 54 respectively, to the sensor 12. The reference admittance generator 78 produces an effective admittance 79 (YR) indicated diagrammatically in phantom, under control of lines 241-244 from the decoder 98. Capacitors CB and CA form a capacitive current divider, attenuating the current through the admittance 33 (Y) produced by sensor 12 in the ratio CB/(CA+CB), and thus coupling an apparent admittance Y*CB(CA+CB), into node 240, where it, plus the admittance of C205 (Y205) must be balanced by YR multiplied by the turns ratio N1/N2 of portions I and II (from "pad" to "shield" and from "shield to "ground" respectively) of winding 274. The balance condition of the bridge is this:

$$N1*YR = N2(Y205 + Y(CB/(CA+CB)))$$

or $$Y = (YR(N1/N2) - Y205)(CA+CB)/CB.$$

Referring again to FIG. 4b, it is noted that the second contact of each of the switches a–d is coupled to shield potential at junction 224. Therefore, when each capacitor C227-C230 is not connected in the reference balance arm of the variable side of the bridge, it is connected in parallel with winding I of transformer 74, where it has negligible effect. This prevents the undesirable effect which would occur if single-pole single-throw switches were used, wherein an unpredictable variable admittance across the open switch contacts results in unpredictable variable leakage currents into the bridge output at 240.

Each of the switches a–d is controlled by the decoder circuit 98. The decoder circuit is provided by NAND gates 247-250, a switch 251 and a pair of opto-couplers e and f provided on an integrated circuit U205, a type ILD-506. The decoder circuit 98 is coupled with the address generator 96 through lines 260 and 261 carrying bi-level address signals $A_0$ and $A_1$. Each line 260 and 261 feeds into a separate one of optocomplers e and f, respectively, contained on the single integrated circuit U205. Transistor conduction in each coupler e and f is caused by high level signals on the lines 260 and 261 through associated LED's coupled into each line 260 and 261. The power line 310 extending from the error amplifier circuit 80 is coupled to the transistor collectors in each coupler e and f. The output of each coupler e and f is a bi-level signal $BA_0$ and $BA_1$, respectively, following the levels of the signals $A_0$ and $A_1$ passed on lines 260 and 261, respectively. Signals $BA_0$ and $BA_1$ are fed into a logic network formed by the single pole, double throw switch 251 (used as an inverter), and the four NAND gates 247–250. Each gate 247–250 is coupled by a line 241–244, respectively, with the switch control node of one of the reference generator switches a–d, respectively. In this way, address signals $BA_0$ and $BA_1$ identifying each of the four switches a–d, are decoded and used to control the operation of those switches. Although the circuit could be arranged otherwise for certain purposes and/or desirability, as shown, the decoder circuit controls the switches a–d such that only one of the capacitors C227–C230 is selected and coupled into the reference arm of the variable side of the bridge at any given time. The emitters of the transistors in the optocouplers e and f are also coupled through load resistors R235 and R236 to shield potential, which serves as a return line. The return line 150 is maintained at approximately 1 volt DC below shield to provide a negative bias for the switches a–d. This is provided by half-wave rectification of the "GND" voltage on line 130 by diode D206 and storage capacitor C209 with R238 to limit the peak current through D206. Filtering is provided by R239 and C204. Power line 310 provides between about 7.5 VDC and 8 VDC with respect to shield, and is locally filtered by C208 and C225.

Figure 4C:
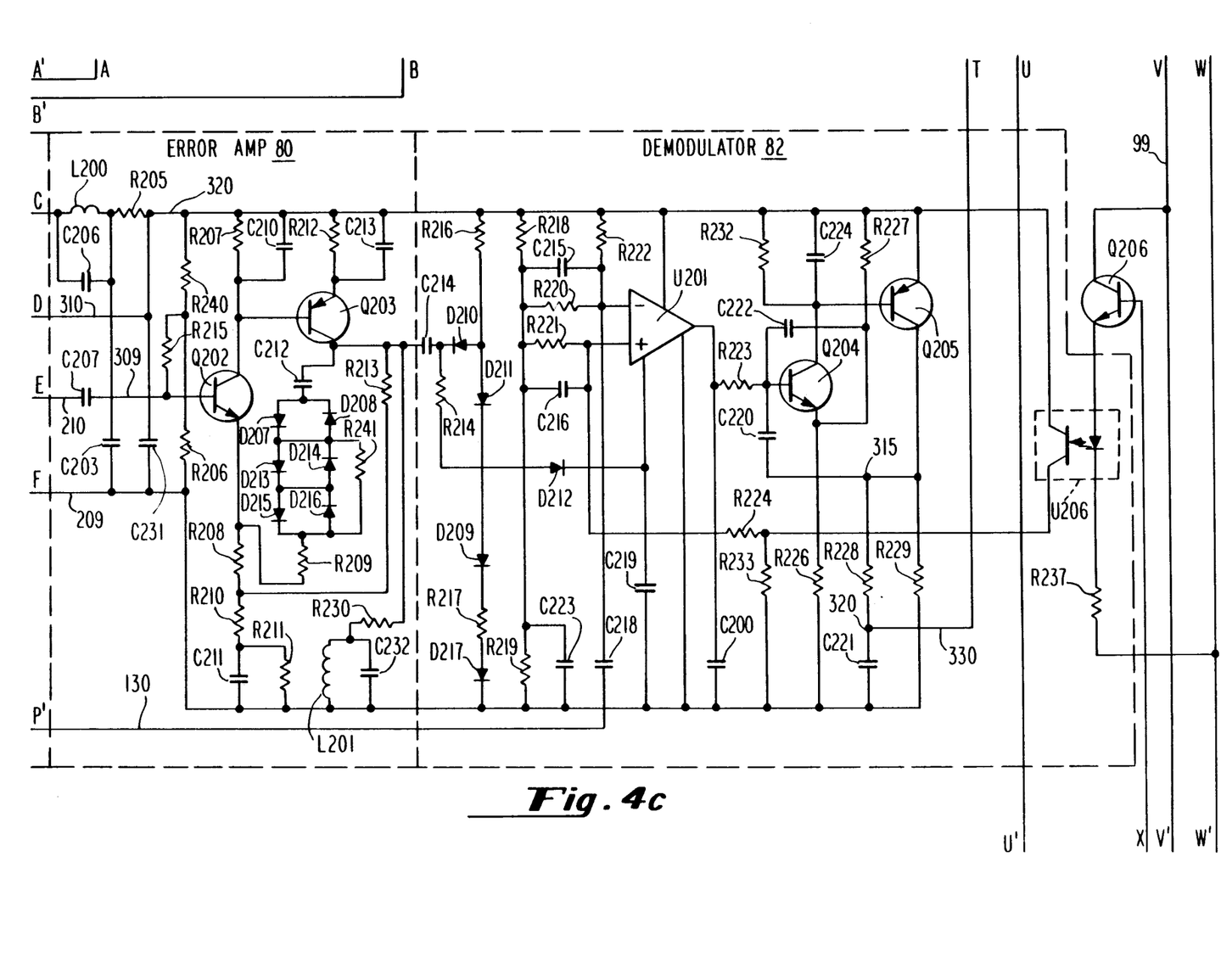
FIG. 4c is a schematic of the error amplifier and demodulator.

FIG. 4c depicts schematically the components of the error amplifier 80 and the demodulator 82. Referring first to the error amplifier on the left side of the figure, line 110 brings the approximately 8.4 volt of direct current from the power supply to a parallel resonant bandstop filter formed by L200 and C206, which couples the 8.4 VDC while preventing a large AC current from flowing through C203 into the shield. C203 provides a low impedance path from the output of L200-C206 to shield, filtering the DC with respect to shield until it is close to the AC potential of shield. R205 and C231 provide additional filtering, producing a voltage on line 310 which is between 7.5 VDC and 8 VDC positive with respect to shield, but at substantially the same AC voltage a shield. Line 310 provides a power supply to the bridge section as was previously discussed. It also provides power to the error amplifier 80, through line 320, and the demodulator 82, and optical isolator U206, type 4N25, associated with the demodulator for feedback from the feedback circuit 20 (See FIG. 3). The bridge output signal from node 240 is carried to the error amp on line 210 and through blocking capacitor 207 into the base of a transistor Q202. The base of transistor Q202 is also coupled through a resistor R215 to the center of a voltage divider network formed by resistors R240 and R206 in series between power supply line 310 and shield line 209. The network R240, R215 and R206 bias transistor Q202 in its active region. The collector of Q202 is coupled with the power line 310 through resistor R207 and capacitor C210 in parallel. The emitter of Q202 is coupled with the shield line 209 through resistors R208 and R210 in series with a by-pass capacitor C211 and resistor R211 in parallel. A second transistor Q203 is controlled by the first transistor Q202. The base of Q203 is coupled with the junction of R207 and C210 and the collector of Q202. C210 greatly attenuates frequencies higher than the signal frequency in order to prevent parasitic oscillation. The emitter of Q203 is also coupled with the power supply line 310 through parallel connected emitter bypass capacitor 213 and resistor R212. The collector of Q203 provides an output to demodulator 82 through capacitor C214, and feedback to the emitter of Q202 through the voltage divider formed by R213 and R210, and through resistor R208. Additional feedback from Q203 to Q202 is provided by a multistage diode-switched feedback network comprising C212, D207, D208, R241, D213, D214, D215, D216, R209 and R208. A DC return for the collector current of Q203 is provided by R230, L201, and C232. L201 and C232 are parallel resonant near the signal frequency, allowing the amplifier to have a high load impedance and thus, a high gain. They provide a low impedance load outside the frequency range of interest, thus reducing the gain of the amplifier for signals outside that range. L201 also enables the output to swing below the negative supply rail, thus widening the dynamic range of the amplifier.

Figure 6:
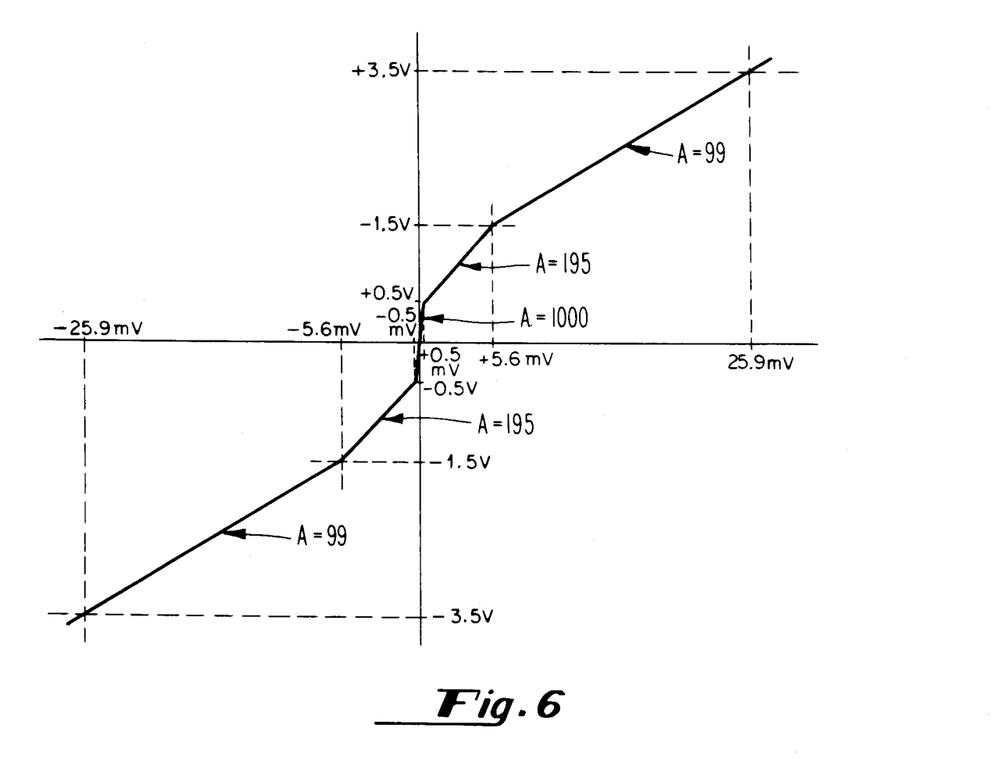
FIG. 6 depicts diagrammatically variable gain applied by the error amplifier.

The error amplifier 80 provides amplification over a wide dynamic range of input while compressing the dynamic range of its output, so as to greatly simplify the design of the demodulator 82. The multistage diode-switched feedback network of FIG. 4c provides three levels of feedback to the emitter of Q202, and thus the three levels of amplification depicted diagrammatically in FIG. 6. For very low levels of bridge network output ($\pm 0.5$ millivolt or 1 millivolt or less peak-to-peak), none of the diodes conduct and gain is set at 1000 by the ratio of resistors R213 and R210. Near bridge balance, an approximately $\frac{1}{4}$ millivolt peak-to-peak change in the bridge output voltage level is required to actuate the unit. For bridge output signal levels between 1.0 and 11.3 millivolts peak-to-peak, diodes D207 and D208 conduct. This adds the feedback developed by resistors R241 and R209 across R208 and R210 to that developed by R213 across R210. The extra resistors reduce the incremental gain from 1000 to 195. For bridge output signal levels in excess of 11.3 millivolts peak-to-peak, diodes D213–D216 also conduct, bypassing R241 and further reducing the incremental gain to 99. With the maximum possible input signal (about 52.6 millivolt peak-to-peak), the output level is 7.08 volts peak-to-peak, for an effective overall gain of 135. The dynamic gain reduction provided by the diode network in the error amplifier preserves both amplitude and phase information, allowing the system to resolve susceptance changes as small as 300 microsiemens in the presence of conductive signals as large as 14000 microsiemens. This is equivalent to detecting a 450 pf, capacitor in the presence of a 70 ohm resistor.

An amplifier U201, type CA3080, is provided for demodulation of the susceptive component from the bridge output signal. The gain input (pin 5) of the amplifier U201 is coupled with the capacitor C214 through resistor R214 and diode D212. C214 is a DC blocking capacitor for passing only the AC portion of the error amp output. The line between the output of D212 and the gain input of amplifier U201 is also coupled through capacitor C219 with the shield line 209. A voltage divider network is provided by resistor R216, diodes D211 and D209, resistor R217 and diode D217 series connected between the power supply line 310 and the shield line 209. The diode D210, resistor R216 and input resistor R214 and diode D212, form a bias chain steering current from the output of the voltage divider to the gain input of amplifier U201. An AC reference signal, substantially in phase with the shield-to-ground voltage is generated between the inverting and non-inverting inputs of the amplifier U201 with a network including resistors R218–R222 and capacitors C215, C216, C218 and C223. C218 and C215 are primarily responsible for introducing the AC component from bridge input. C223 smoothes the voltage taken from between R218 and R219. When the reference AC signal generated across the inverting and non-inverting inputs of U201 is in phase with the bridge output signal passed through capacitor C214, the output current of U201 will contain a DC component proportional to the product of the reference signal generated across the inverting and non-inverting inputs multiplied by the in-phase component of the gain-control current (due to the bridge output signal). When the phasing of the bridge output signal is sufficiently different from that of the reference signal the in-phase component is small, and the resulting DC, is correspondingly diminished. In this way, only the susceptive components of the bridge output, which are in phase with the reference signal, cause a net DC output. By appropriate choice of component values, the demodulator may be made to respond also to the conductive component of the bridge output. This may be useful in enabling the apparatus to compensate for admittances interfering with measurement of desired material conditions, e.g. as described in U.S. Pat. No. 3,746,975 to Maltby.

The DC component of the output of amp U201 is filtered by C200 and amplified by transistors Q204 and Q205 and associated resistors R223, R232, R226, R227 and R229 and capacitors C220, C222 and C224. The amplifier acts as a switch pulling junction 315 high or low. The high impedance output of amplifier U201 is coupled to the base of transistor Q204 through resistor R223. R223 is provided to additionally filter the output of amp U201 in conjunction with C222. Resistor R232 and capacitor C224 are coupled in parallel between the power supply line 310 and the collector of Q204. The output of R232 and C224 is also coupled to the base of a second transistor Q205. A resistor R227 is connected from the power line 310 to the emitter of Q204 and through a capacitor C222 to the output of resistor R223. Load resistors R226 and R229 return the current through Q204 and Q205, respectively, to shield line 209. The voltage at junction 315 is fed back to the base of transistor Q204 through capacitor C220, and is outputted through resistor R228 to capacitor C221. A voltage output of the demodulator is carried on line 330 to the output amp 84. R228 and C221 prevent any AC current in line 330 from being fedd into junction 315, and thus back to the base of Q204.

A positive feedback to the demodulator 82 is further provided from the feedback circuit 20 (see FIG. 3) through optical isolator U206, a type 4N25. Resistor R224 is provided between the output of the opto-coupler U206 and the noninverting input of the amplifier U201 to introduce controlled hysteresis into the demodulator switching point. Load resistor R233 is also coupled between the opto-coupler U206 output and the shield line 209. The opto-coupler U206 is driven by an output from transistor Q206. A voltage supply line 99 from the power supply 58 power Q206. The base of Q206 is coupled with the output of multiplexer 88 in the feedback circuit 20 (see FIG. 3).

Figure 4D:
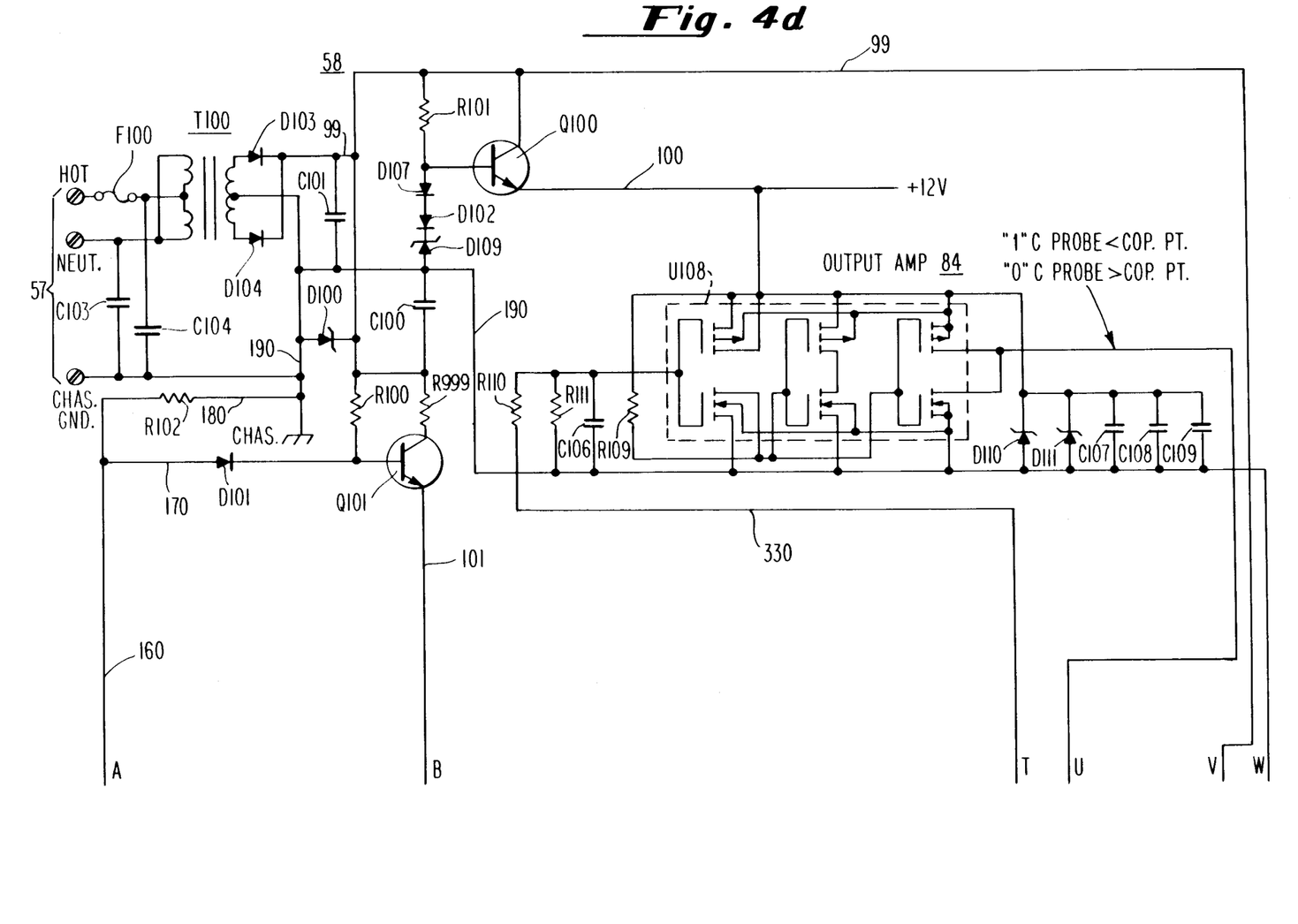
FIG. 4d is a schematic of the output amplifier and power supply.

Referring now to FIG. 4d, the circuit associated with the output amp 84 is depicted. This includes an integrated circuit U108, type CD4007, containing a six transistor array which is coupled between a +12 volt power supply line 100 and a ground return line 190. Resistors R110–R111 and capacitor C106 together provide biasing and filtering of the demodulator output. Zener diodes D110 and D111 and capacitors C107–C109 provide overvoltage and spike protection and local filtering of the +12 volts supply to the output amp and digital components coupled with +12 volt line 100.

The output of the amp 84 is a bi-level or logic level signal fluctuating between 12 volts and ground and is carried on line 85 to the output circuits 90 and feedback circuit 20. In particular, the output amp output signal is carried to the data input of a latch 86 constituting part of the feedback circuit 20 of the system.

Figure 4E:
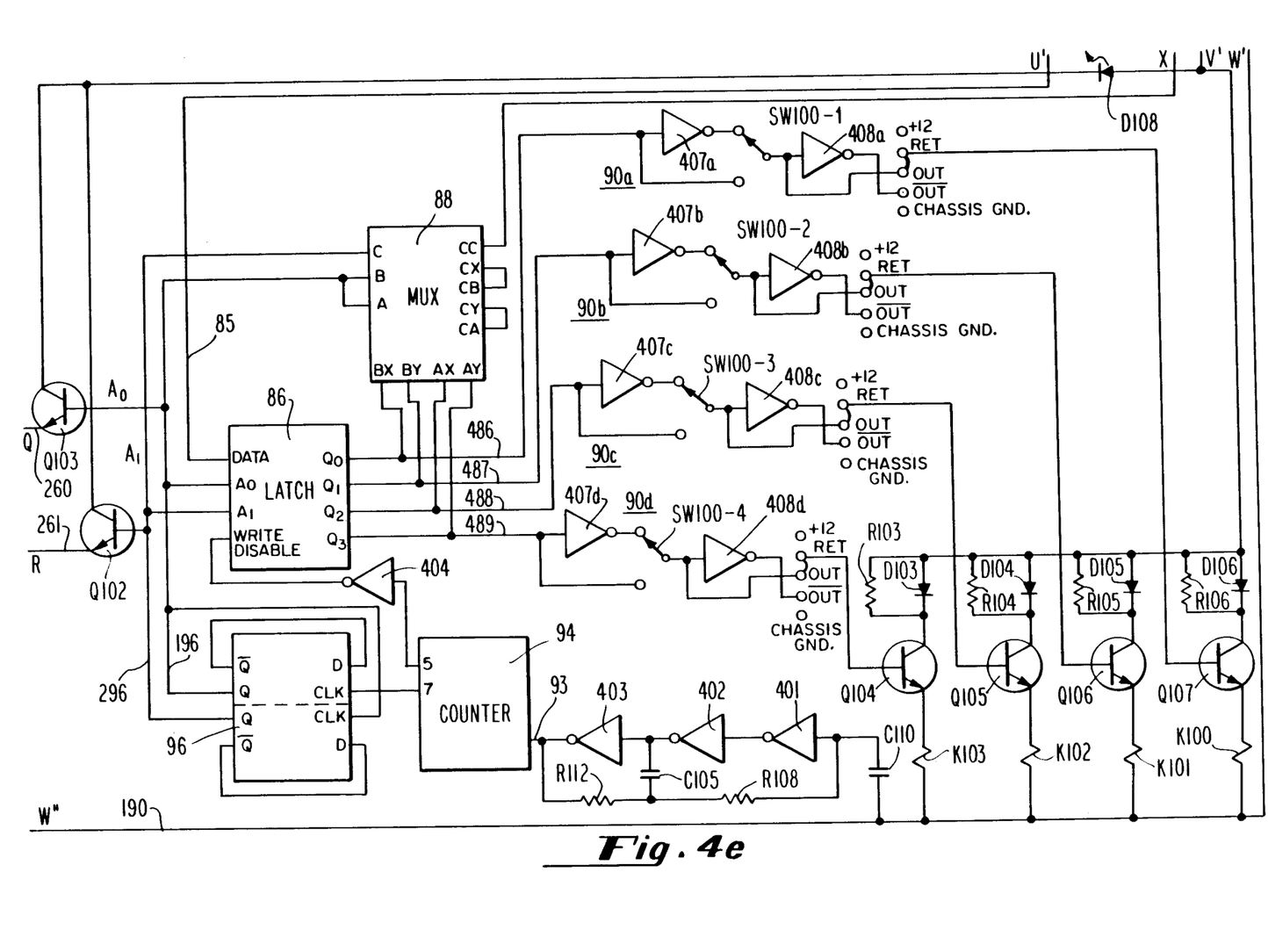
FIG. 4e is a schematic of the address generator, feedback and output circuits.

Referring now to FIG. 4e, there are depicted the components of the feedback circuit 20, the controller 22 and output circuits 90. At the bottom center of the figure, the clock 92 of FIG. 3 is provided by the well-known three-inverter multivibrator formed by capacitances C105 and C110, resistors R108 and R112 and three inverters 401, 402 and 403 of six inverters of a CMOS Schmitt inverter, type CD40106. A 40 hertz square wave is generated by the clock and is passed on line 93 to the input of a CMOS decade counter or divider 94. The divider divides the 40 hertz signal by ten and outputs two signals 50 milliseconds apart on the "5" and "7" outputs. One signal, generated 125 milliseconds after the start of the count cycle, is passed through another inverter 404 to the write disable pin of latch 86. A second signal, occurring 175 milliseconds into the cycle, is passed to a clock input of an address generator 96 formed by a CMOS dual flip-flop chip, type CD4013. The flip-flop 96 outputs two address signals $A_0$ and $A_1$ on lines 196 and 296, respectively. The address signals are carried to two of the three address lines of the octal latch 86 and to the address lines of a CMOS multiplexer 88, type CD4053. Each of the address lines 196 and 296 is also carried to the bases of transistors Q103 and Q102, respectively. The emitters of these transistors pass fluctuating current signals on lines 260 and 261 to each of the optical isolators e and f, respectively, in the dual opto-isolator device U205 of the decoder circuit 98 (see FIG. 4b). Load resistors R200 and R201 (see FIG. 4b) return current from the LED's of optical isolators e and f to ground line 190. The first (125 millisecond) counter signal causes the octal latch 86 to write the high or low state of the output amp output signal into the storage element addressed by address lines $A_0$ and $A_1$. The latch 86 therefore stores the bi-level characteristic of the output amp signal for each of the adjustable capacitors C227 through C230 in turn as it is coupled into the bridge. Fifty milliseconds later, the second (175 millisecond) counter signal causes the address generator 96 to increment the address, switching a new capacitor into the bridge. The system is given two-tenths of a second to stabilize before the then current state of the output amp signal is again written into another storage element of the latch. The latch 86 outputs, on each of four lines 486–489, the bi-level states of the system with respect to each of the four set points controlled by each of the four capacitors C227–C230. Multiplexer 88, under the control of the address lines 196 and 296, selects the latch output signal corresponding to the particular capacitor C227–C230 currently switched into the variable side of the bridge and outputs that signal to the base of the transistor Q206. The output of transistor Q206 is passed through the opto-coupler U206. As was explained earlier with respect to the demodulator circuit, the output of the opto-coupler U206 is passed to the demodulator amp for positive feedback. Opto-coupler U206 and assembly U205 with opto-couplers e and f are provided to electrically isolate the components of the bridge, error amp and demodulator from the feedback and controller circuitry for intrinsic safety considerations. If desired, other conventional means, such as transformers, might be provided for the same function.

Coupled with each of the four output lines from the addressable latch 86 is an output circuit 90a–90d, respectively. These output circuits are conventional and identical. Therefore, only the components at 90a will be described. Each includes one of a first inverter 407a–407d and a second inverter 408a–408d, respectively, all type CD40106. A switch SW100-1 through SW100-4, operable from the face of the control box 50 by one of the controls 64 (see FIG. 2), is provided for selecting either the output from the latch for high level fail safe switching or the output from the first inverter 407 for low level fail safe switching. The output of the switch 64 is passed through and around the second inverter 408 to a plurality of conventional time-delay module connections. An output from one of these connections is carried, in the depicted embodiment, to the base of an associated transistor Q104–Q107. Each transistor is controlled to activate an associated LED D103–D106, respectively, while energizing the coil of a conventional, double-pole, double-throw relay. Each of the relays K100–K103 is provided with 2 sets of three contacts (not shown for simplicity) coupled with the two sets of external connectors 68i and 69i on the face of the control box 50 in FIG. 2. Line 99 from the power supply 58 provides approximately 20 volts DC and is used to power the relays K100–K103, the optical isolators U205 and U206, transistors Q102–Q107 and Q206, as well as an LED D108 located in the line supplying current to Q102 and Q103. Diode D108 is the same as LED 56 on the face of control box 50 in FIG. 2 and switches in the sequence, from high-low-low-off, in response to the current drawn through the transistors Q102 and Q103 under the control of the address generator U103.

Referring again to FIG. 4d, the circuitry of the power supply 58 is depicted. The power supply 58 is conventional. A three-line AC power source 57 (shown in FIG. 2) is converted to 28 VRMS center-tapped by transformer T100, rectified by diodes D103 and D104, stored in capacitor C101, and supplied as pulsating DC at about +20 volts to the remaining circuitry on line 99. Resistor/diode networks formed by R100, R101, R102, R999, D101, and D107, D102 and D109, supply DC at approximately ±12 volts from Q100 on line 100 with respect to line 190 and ±8.4 volts direct current on line 101 with respect to line 160 from transistor Q101.

Figure 7:
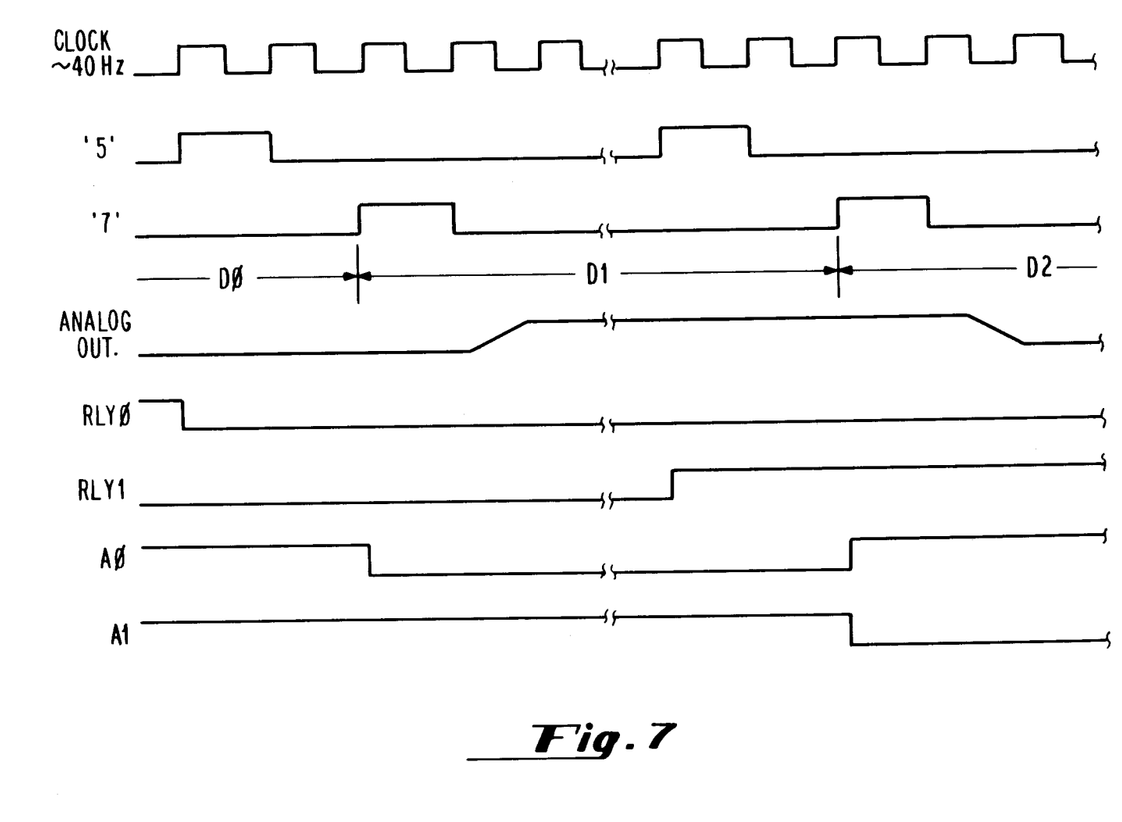
FIG. 7 depicts diagrammatically various timing and control signals.

FIG. 7 depicts several of the timing and control signals employed by the system in relation to an output signal. The first line shows the 40 hertz squarewave signal output by the clock 92 of FIG. 3. The output of the signals on the "5" and "7" count outputs of the divider/counter are also depicted showing the signals go high at the 125 and 175 millisecond outputs of the clock 92, respectively. The analog output of the demodulator is initially low. Both address signals A0 and A1 are initially high and identify the first set point. When the "5" output goes high, the latch 86 sets the output amplifier output (which would be low) to a first storage element, outputting the first reference admittance/first set point output signal RLY0. The "7" output then goes high, causing the A0 signal to go low, identifying the second reference admittance to be coupled into the variable side of the bridge network. That capacitor causes the analog output of the demodulator to go high. Stabilization is allowed before the "5" output again goes high. The high output of the demodulator is stored in a second storage element of the latch and causes an output signal RLY1 to be high. The "7" output from the divider/counter 94 again goes high causing the A0 signal to go high, triggering the A1 signal to go low and identifying a third capacitor to be coupled into the bridge network. The process is repeated for the third and a fourth capacitor, and begun again for the first capacitor.

Although a preferred embodiment of the invention has been described, variation of the preferred embodiment will be apparent to those of ordinary skill in the art. For example, other oscillators, bridges, error amps and output amps may be provided. In place of the demodulator, other conventional phase sensitive detection circuits may be provided. Moreover, other known circuit arrangements can be substituted for the described feedback circuit 20 and the controller 22. For example, in a two-set point monitoring system, the address generator might be formed by a single flip-flop and the entire decoder network previously described, eliminated. Furthermore, although a plurality of capacitors and switches in series have been described for the preferred reference admittance generator, other circuits and devices for automatically generating a series of different capacitances or admittances automatically might be substituted with appropriate modifications.

We claim:

1. A system for monitoring a specified condition of materials at multiple set points comprising:
   comparison means having a pair of inputs;
   material sensing means comprising a single admittance probe coupled to one of the inputs of the comparison means for providing an admittance indicative of the condition of the materials;
   sequential admittance generator means coupled to the other input of the comparison means for automatically and repeatedly providing a plurality of different admittance values, each admittance value corresponding to a different set point;
   detector means coupled to the comparison means for detecting a difference between the admittance provided by the material sensing means and each of the admittances provided by the sequential admittance generator and providing an output indicative thereof;
   storage means coupled to the detector means for storing indications of differences detected by the comparison means for each admittance value provided by the sequential admittance generator means;
   output means coupled to the storage means for providing a plurality of output signals, each output signal corresponding to at least one of the indications stored by the storage means; whereby each output signal represents a relationship between at least one of the multiple set points and the condition of the materials indicated by the material sensing means.

2. System according to claim 1 wherein the comparison means comprises a bridge network having a pair of arms representing the inputs of the comparison means, the detector means detecting an imbalance condition in the bridge network for each admittance value provided by the sequential admittance generator.

3. System according to claim 2 wherein the output provided by the detector means is indicative of at least one degree, phase and direction of imbalance in the bridge network.

4. System according to claim 2 further comprising means coupled to the bridge network for energizing the bridge network by applying an alternating signal thereto.

5. System according to claim 2 further comprising feedback means coupled between the storage means and the detector means, the feedback means providing to the detector means, for each admittance value provided by the sequential generator means, an indication of the imbalance condition of the bridge network when the corresponding admittance value was last provided.

6. System according to claim 5 wherein the feedback means introduces controlled hysteresis into the detector means.

7. System according to claim 5 wherein the feedback means prevents interaction between successive set points.

8. System according to claim 2 wherein the sequential admittance generator means comprises:
   a plurality of capacitors; and,
   means coupled to the plurality of capacitors for selecting a sequence thereof.

9. System according to claim 8 wherein the means coupled to the plurality of capacitors comprises:
   a clock;
   a counter coupled to and sequenced by the clock;
   an address generator coupled to the counter for providing addresses in response to outputs provided by the counter;
   a decoder circuit coupled to the address generator for decoding the addresses;
   switch means coupled to the decoder means for selectively coupling the capacitors to one of the pair of arms of the bridge network.

10. System according to claim 2 wherein the detector means comprises an error amplifier.

11. System according to claim 10 wherein the detector means further comprises a demodulator coupled to the error amplifier.

12. System according to claim 11 further comprising an output amplifier coupled to the demodulator for providing bi-level signals indicative of the direction of imbalance of the bridge network.

13. System according to claim 12 wherein the storage means comprises:
   latch means having a plurality of stages for storing each of the bi-level signals provided by the output amplifier; and,
   multiplexer means coupled to the latch means and to the address generator for selecting one of the signals stored in the latch means for feedback to the demodulator.

14. System according to claim 13 wherein the output means is coupled to the latch means and each output signal is derived from a different stage of the latch means.

15. Apparatus comprising:
   (a) an admittance probe;
   (b) a bridge network having a pair of arms, the admittance probe being coupled to one of the arms;
   (c) sequential admittance generator means coupled to the other arm of the bridge network for automatically and repeatedly providing, in sequence, a plurality of admittances, each representing a set point for comparison with an admittance provided by the probe;
   (d) oscillator means coupled to and energizing the bridge network;
   (e) detection means coupled to the bridge network for providing an indication of at least one of degree, phase and direction of imbalance in the bridge network for each admittance provided by the sequential admittance generator means;
   (f) storage means coupled to the detection means for storing an indication of at least the direction of imbalance of the bridge network for each admittance provided by the sequential admittance generator means;
   (g) feedback means coupled between the storage means and the detector means for providing to the detector means, for each admittance value provided by the sequential admittance generator means, the indication of imbalance of the bridge network stored by the storage means for the corresponding admittance last provided by the sequential generator admittance means; and,
   (h) output means coupled to the storage means for providing a plurality of output signals, each output signal corresponding to at least one of the indications stored by the storage means.

16. Apparatus according to claim 15 wherein the detector means comprises a demodulator and the feedback means introduces controlled hysteresis into the demodulator, the feedback means preventing interaction between successive set points.

17. Apparatus according to claim 15 wherein the sequential admittance generator means comprises:
   a plurality of capacitors; and,
   means coupled to the plurality of capacitors for selectively coupling one or more thereof to the bridge network.

18. Apparatus according to claim 17 wherein the means coupled to the plurality of capacitors comprises:
   clock means;
   counter means coupled to and sequenced by the clock means;
   address generator means coupled to the counter means for providing addresses in response to outputs from the counter means;
   decoder means coupled to the address generator means for decoding the addresses; and,
   switch means coupled to the decoder means and to the plurality of capacitors for coupling the capacitors to the bridge network in response to outputs from the decoder means.

19. Apparatus according to claim 15 wherein the storage means comprises:
   plural stage latch means receiving the indications from the detection means and storing the indication corresponding to each admittance provided by the sequential admittance generator means in a different stage; and,
   multiplexer means coupled to the latch means and to an address generator associated with the sequential admittance generator means for selecting one of the indications stored in the latch means for feedback to the detector means.

20. Apparatus according to claim 19 wherein the indications received by and stored in the latch means are bi-level signals indicative of the direction of imbalance of the bridge network.

21. Apparatus according to claim 19 wherein the output means is coupled to the latch means and each output signal is derived from a different stage of the latch means.

22. Apparatus for monitoring a specified condition of materials at multiple set points comprising:
(a) material sensing means comprising only a single admittance probe for providing an admittance related to a condition of materials desired to be monitored;
(b) a bridge network having a pair of arms, the material sensing means being coupled to one of the arms;
(c) sequential admittance generator means coupled to the other arm of the bridge network for automatically and cyclically providing a plurality of admittances each representing a set point for comparison with the condition of materials monitored, the sequential admittance generator means comprising a plurality of capacitors and means coupled to the plurality of capacitors for selectively coupling one or more thereof to the bridge network;
(d) an error amplifier coupled to the bridge network and a demodulator coupled to the error amplifier for providing an indication of at least one of degree, phase and direction of imbalance of the bridge network;
(e) an output amplifier coupled to the demodulator for providing a bi-level signal indicative of at least the direction of imbalance of the bridge network;
(f) storage means comprising a plural stage latch coupled to the output amplifier for storing, for each admittance provided by the sequential admittance generator means, the bi-level signal provided by the output amplifier;
(g) multiplexer means coupled to the storage means, to the means coupled to the plurality of capacitors, and to the demodulator for selecting, for each admittance provided by the sequential admittance generator means, the bi-level signal stored in the storage means for the corresponding admittance last provided by the sequential admittance generator means for feedback to the demodulator;
(h) output means coupled to the storage means for providing a plurality of output signals, each output signal being derived from at least one of the stages of the latch and representing a relationship between at least one of the set points and the condition of materials monitored.

23. Method of monitoring a specified condition of materials comprising the steps of:
(a) providing an admittance related to the condition of materials monitored;
(b) automatically and cyclically comparing a plurality of reference admittances to the admittance provided in step (a), each reference admittance corresponding to one of a plurality of set points;
(c) detecting a difference between each reference admittance and the admittance provided in step (a) and providing an indication of each difference;
(d) storing each indication provided in step (c);
(e) providing a plurality of output signals each corresponding to at least one of the stored indications, each output signal representing a relationship between the monitored condition and at least one of the set points.

24. Method according to claim 23 wherein step (c) includes introducing controlled hysteresis by feeding back, for each reference admittance provided in step (b), the indication stored for the corresponding reference admittance last provided in step (b).

* * * * *